United States Patent [19]

Kobayashi et al.

[11] Patent Number: 5,231,937
[45] Date of Patent: Aug. 3, 1993

[54] PULVERIZED COAL BURNER, PULVERIZED COAL BOILER AND METHOD OF BURNING PULVERIZED COAL

[75] Inventors: Hironobu Kobayashi, Katsuta; Kiyoshi Narato, Taga; Shigeru Azuhata; Hiroshi Miyadera, both of Hitachi; Shigeki Morita, Hiroshima; Tadashi Jimbo, Kure; Kunio Hodozuka, Kure; Akira Baba, Kure, all of Japan

[73] Assignees: Hitachi, Ltd.; Babcock-Hitachi Kabushiki Kaisha, both of Tokyo, Japan

[21] Appl. No.: 663,319

[22] Filed: Mar. 1, 1991

[30] Foreign Application Priority Data

Mar. 7, 1990 [JP] Japan .................................. 2-53688

[51] Int. Cl.$^5$ .................................................. F23D 1/00
[52] U.S. Cl. .................................. 110/262; 110/263; 110/265; 110/347
[58] Field of Search .......................... 110/260–265, 110/347

[56] References Cited

U.S. PATENT DOCUMENTS

| 4,655,148 | 4/1987 | Winship | 110/265 |
| 4,807,541 | 2/1989 | Masai et al. | 110/262 |
| 4,838,185 | 6/1989 | Flament | 110/263 |
| 4,907,962 | 3/1990 | Azuhata et al. | 110/262 |
| 4,915,619 | 4/1990 | LaRue | 110/265 |

FOREIGN PATENT DOCUMENTS

| 125818 | 1/1931 | Fed. Rep. of Germany . |
| 54-159741 | 12/1979 | Japan . |
| 54-159742 | 12/1979 | Japan . |
| 57-12209 | 1/1982 | Japan . |
| 60-86311 | 5/1985 | Japan . |
| 60-202204 | 10/1985 | Japan . |
| 62-172105 | 7/1987 | Japan . |
| 63-87508 | 4/1988 | Japan . |
| 64-57004 | 3/1989 | Japan . |
| 1-256708 | 10/1989 | Japan . |

Primary Examiner—Henry C. Yuen
Attorney, Agent, or Firm—Antonelli Terry Stout & Kraus

[57] ABSTRACT

A burner for pulverized coal has a coal duct for pulverized coal and primary combustion air and a secondary combustion air duct such that the coal and primary air and secondary air mix outside the outlet nozzles of the duct in a mixing zone at which combustion occurs. Coal distribution means in the coal duct create, adjacent the outlet nozzle, at least one outer zone of flow spaced from the coal duct axis and at least one inner zone of flow nearer the coal duct axis. These are means for slowing flow in the outer zone relative to the flow in the inner zone, prior to the mixing zone. To achieve good mixing, and promote $NO_x$ reduction, the coal concentration in the outer zone is higher than in the inner zone. The slowing means may be radially inwardly projecting baffles.

40 Claims, 7 Drawing Sheets

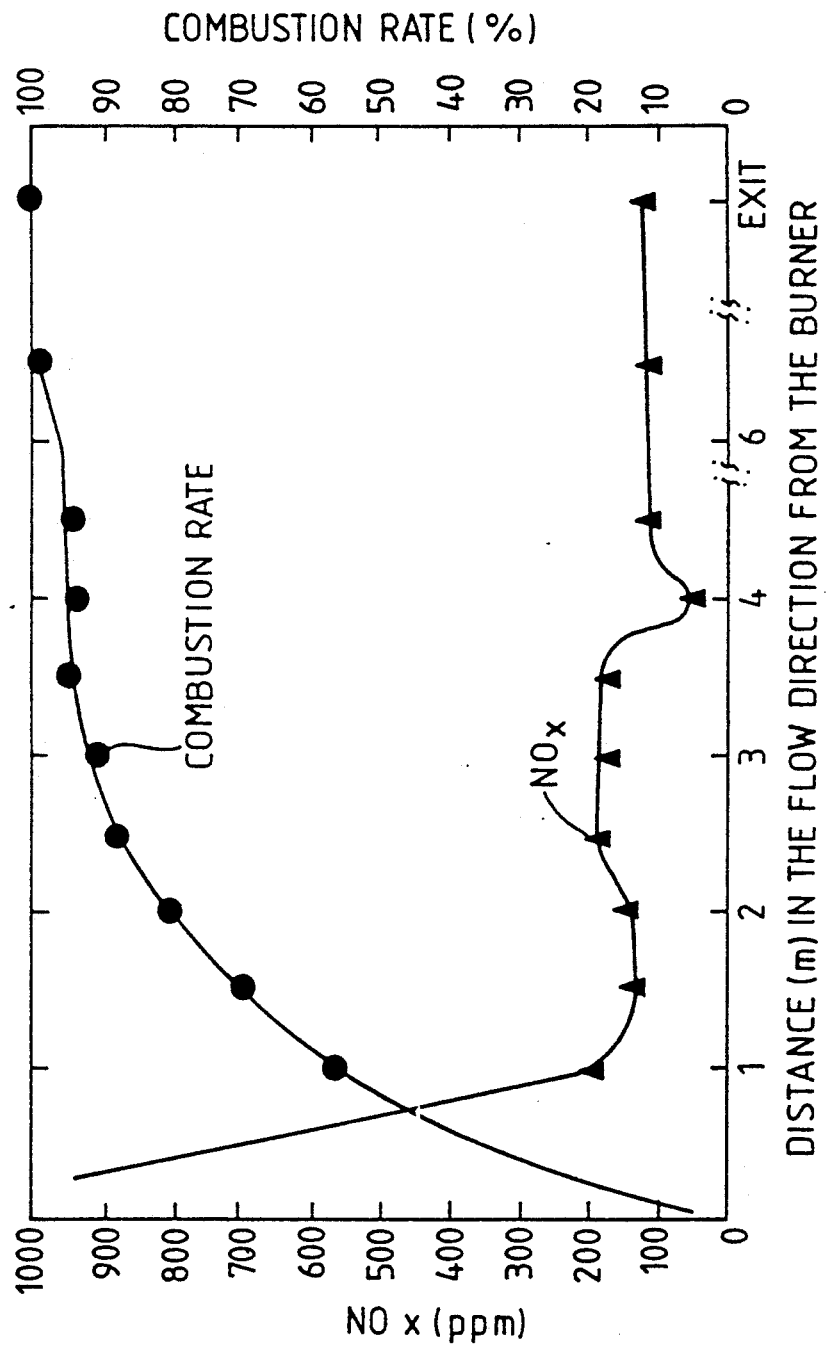

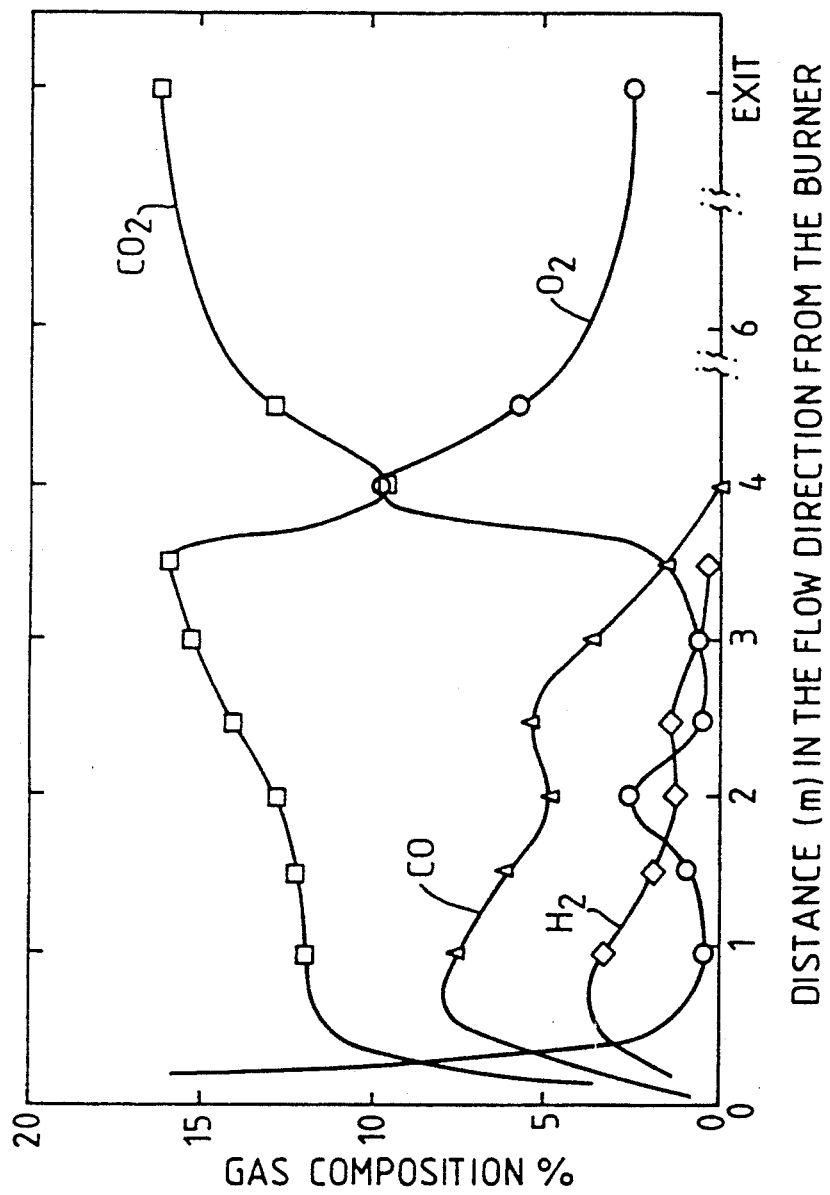

PULVERIZED COAL BURNER, PULVERIZED COAL BOILER AND METHOD OF BURNING PULVERIZED COAL

BACKGROUND OF THE INVENTION

1. FIELD OF THE INVENTION

The present invention relates to a pulverized coal burner and a boiler including such a burner, and to a method of burning pulverized coal, and more particularly is concerned with reducing the nitrogen oxides (which will be abbreviated to "$NO_x$") produced at the time of the combustion of coal.

2. DESCRIPTION OF THE PRIOR ART

The $NO_x$ produced at the time of the combustion of pulverized coal almost entirely comes from the oxidization of nitrogen contained in the coal. The nitrogen in the coal is decomposed and released at the pyrolysis in the initial combustion into hydrogen cyanide (HCN) or ammonia ($NH_3$). These are oxidized into $NO_x$, but also can have the effect of reducing $NO_x$ to $N_2$ under a condition of low oxygen concentration.

A typical combustion method is a two-stage one in which an excess fuel (air lean) combustion is performed in a burner unit so that the residual combustible components at the downstream of the flame are burnt out with air for complete combustion. This method is effective for reducing $NO_x$ and is adopted in many boilers but requires a large combustion chamber for mixing and burning all the combustion air and the combustible components, so that the boiler is large in size. As a result, the combustion has to be effected in the burner using an amount of air substantially necessary for complete combustion, thereby to improve the combustion efficiency in the flame formed in the burner and reduce $NO_x$. Such burners are disclosed in JP-A-60-226609 and JP-A-62-276310; in which the combustion air is divided into primary, secondary and tertiary air flows and in which the mixing between the tertiary air for the complete combustion and the excess fuel flame a the central portion is delayed to facilitate the formation of a reducing atmosphere for $NO_x$ in the central portion of the flame. On the other hand, a burner for controlling the mixing state of the fuel and the air by sliding a fuel supply tube is disclosed in JP-A-55-17060, JP-A-56-44505 and JP-A-56-119406.

In order to realize the excess fuel combustion methods described above, the pulverized coal has to be ignited with as little air as possible before the tertiary air is mixed. Moreover, the fuel to be supplied from the coal nozzle has to be divided in the combustion chamber into (a) a fuel to be supplied to the central portion of the flame so as to form the reducing atmosphere for $NO_x$, and (b) a fuel to be supplied as a heat source for promoting the pyrolysis of the coal supplied to the $NO_x$ reducing atmosphere at the central portion of the flame to the outer circumference of the flame to mix the combustion air and the coal thereby to activate the combustion. For this, it is necessary to control the coal concentration at the exit of the coal duct.

A method of changing the coal distribution in the pulverized coal duct, with the aforementioned point in mind can be classified into the following two types: (i) the carrier air flowing through the coal duct is swirled to change the distribution of the coal, as disclosed in JP-A-57-12209, JP-A-63-87508 and JP-A-54-159741; and (ii) the distribution of the coal is changed by using a venturi for narrowing the central portion of the passage of the coal duct and then diverging the downstream passage, as disclosed in JP-A-54-159742, JP-A-60-202204 and JP-A-62-172105.

In the method (i), the coal is concentrated in the vicinity of the inner circumference of the coal duct by the swirling flow of the carrier air, and a concentric passage is arranged downstream to reduce the coal concentration at the central portion of the coal duct and to enrich the coal concentration of the coal duct of the outer circumferential passage. This method can control the coal concentration but changes the flow rate distribution of the coal carrying air. Since the carrier air is also swirled and concentrated at the inner circumference of the coal duct, the injection velocity at the central portion of the coal nozzle is decelerated but that at the outer circumference is accelerated. According to the coal injection of this method, the coal injected at a low velocity into the central portion is influenced by the swirls, which are generally added to the combustion air injected from the outer circumference of the coal nozzle, so that the coal is spread radially outwardly from the burner axis. Since such behaviour of the coal acts to reduce the coal supplied to the aforementioned $NO_x$ reducing atmosphere and accordingly to block the reactions of the $NO_x$ reducing atmosphere, there arises a problem from the view point of the low $NO_x$ combustion of the coal.

In the method (ii), the coal and the carrier air are accumulated at the central portion of the venturi so that the distribution of the coal may be controlled by making use of the inertia of the coal at the downstream diverging portion. According to this method, the coal to be injected from the central portion of the coal nozzle and supplied to the $NO_x$ reducing atmosphere is increased and injected from the outer circumference of the coal nozzle so that the coal to be supplied to the outer circumference of the flame is reduced. As a result, the fuel in the outer circumference of the flame is reduced, becoming poorly ignitable. On the other hand, the fuel to be supplied to the $NO_x$ reducing region is delayed in its mixing with the combustion air. If the fuel in this reducing region is increased, the ratio of the unburned fuel at the exit of the combustion chamber is increased, lowering the boiler efficiency.

In the light of the present invention, described below, certain features of the prior art disclosures, including some mentioned above, are now mentioned more particularly:

In JP-A-54-159741, the flow is swirled by vanes in the coal duct slightly upstream of its exit. The radially outer parts of the flow then pass through a converging annular exit passage which accelerates them.

JP-A-56-44505 shows swirl vanes at the exit of the coal duct, which then has a divergent exit flare to give highly divergent coal distribution.

In JP-A-57-12209, an upstream cyclone throws coal concentration towards the outside of the coal duct. The radially outer flow is separated from the inner by a concentric conical tubular insert at the convergently conical exit, and accelerated by wedge-shaped spacers between the insert and the outer tube which gradually reduce the available flow cross-section for the outer flow portion towards the exit.

JP-A-62-172105 shows a coal duct with an outwardly divergent transition to a larger diameter section near the exit, and flaring further at the exit. The initial outward divergence gives a relative enrichment of coal in the centre of the exit flow.

In JP-A-60-86311, the exit of the primary passage has a radially-inwardly projecting toothed flange, which is described as inhibiting radial divergence of coal after leaving the exit. JP-A-64-57004 shows the same feature.

JP-A-63-87508 also shows a radially inwardly projecting flange at the coal duct exit, following divergent transition to a larger diameter end portion.

JP-A-1-256708 shows a similar exit flange after a divergence. Because the divergence gives a reduced coal content at the outer part of the flow, the flange is concerned primarily with affecting the flow of air.

The $NO_x$ reducing performance according to the prior art as described is thought insufficient for the environmental regulations which become severer and severer day by day.

SUMMARY OF THE INVENTION

It is one object of the invention to develop a low $NO_x$ burner capable of high performance.

Especially, it is one object to make possible both the size reduction of the combustion chamber and low $NO_x$.

Another feature which the invention can provide is shortening of the combustion chamber using a burner having an ignitability better than the prior art.

Furthermore, by the present invention it is possible to provide a boiler and a burner which can improve the ignitability of pulverised coal at the burner exit without inhibiting the reactions of the $NO_x$ reducing region so that they can have a higher $NO_x$ reducing effect than in the existing burners.

In one aspect, the present invention comprises a burner for pulverized coal comprising, (a) a coal duct for pulverized coal and primary air entraining the coal, having an outlet nozzle at one axial end thereof, (b) at least one secondary air duct for secondary air for combustion of the coal having an outlet nozzle adjacent the outlet nozzle of said coal duct, such that the coal and primary air and secondary air mix outside said nozzles in a mixing zone at which combustion occurs, (c) coal distribution means in the coal duct for creating in the duct adjacent the coal outlet nozzle at least one outer zone of higher concentration of coal in the primary air, and at least one zone of lower concentration of coal in the primary air nearer the coal duct axis than the outer zone, and (d) slowing means for slowing the coal flowing at the outer zone relative to the flow at the inner zone, prior to the mixing zone.

The effect of the invention is that the slowed flow of high concentration of coal in the coal duct outer zone mixes rapidly and well with the secondary air at exit from the coal nozzle, resulting in rapid reduction of oxygen concentration close to the coal nozzle. This restricts $NO_x$ formation and promotes the formation of a further flame region in which reduction of $NO_x$ occurs. In addition, the flame can be short and good ignitability and flame holding can be obtained, due to the rapid mixing.

Preferably, the coal distributing means and the slowing means are arranged so that the coal emerging from the outlet nozzle of the coal duct has substantially no component of flow outwardly from the coal duct axis.

Preferably the secondary air duct is adapted to give the secondary air a swirling flow around the burner axis at its outlet nozzle.

In order to establish a flame stably to improve the ignitability and the flame holding, it has thus been found important to promote mixing in the vicinity of the burner exit between the pulverized coal with the primary carrier air and the ignition air introduced from the outer circumference of the mixture jet of the pulverized coal and the carrier air. In a system involving injecting the combustion air as a swirling flow from the outer circumference of the jet of the pulverized coal and the carrier air, on the other hand, a large circulating flow at a high temperature has to be established in the flame so that the pulverized coal may easily enter the circulating flow. Therefore, it is important to collect the pulverized coal in the vicinity of the circulating flow by reducing the injection velocity of the mixture of the pulverized coal and the air to adjust the distribution of the mixture concentration in the pulverized coal nozzle.

If the injection velocity of the mixture of the pulverized coal and the air is reduced, the pulverized coal at the central portion of the pulverized coal nozzle is dispersed radially outward by the combustion air of the swirling flow. As a result, the ratio, at which the pulverized coal will be burned in the atmosphere with much combustion air in the outer circumference of the flame, is increased whereas the amount of pulverized coal to be burned in the $NO_x$ reducing region is relatively reduced, so that the $NO_x$ concentration at the combustion chamber exit is increased.

In order to reduce the injection velocity of the mixture of the pulverized coal and the air, the exit of the coal duct may be abruptly diverged so as to radially widen the carrier air flow and the fine particles entrained by the former. At this time, the solid particles having relatively large diameters are prevented by their inertia from following the air flow and from being diverged unlike the air flow. As a result, a region having a high solid particle concentration is established in the vicinity of the inner circumference of the pulverized coal nozzle. This is undesirable.

In the present invention, the pulverized coal can be collected in the vicinity of the circulating flow which is established in the nozzle outer circumference within the combustion chamber. The air velocity at the central portion of the pulverized coal nozzle can be increased to a higher value than that of method (i) described above, i.e. the method of controlling the dispersion of the pulverized coal by swirling the carrier air, so that the $NO_x$ concentration can be reduced without reducing the amount of the pulverized coal to be supplied to the $NO_x$ reducing region.

In the invention, the coal distributing means preferably comprises a core portion of the coal duct having a cross-section which decreases gradually in the direction of said flow along said coal duct, so that the flow area increases. The air diverges towards the duct axis, but the heavier coal particles remain in the outer zone.

This gradually reducing cross-section core portion of the coal duct may be provided by at least one surface at an angle in the range 10° to 45° to the duct axis. Suitably, the core portion is axially movable to adjust the position of said gradually reducing cross-section relative to the outlet nozzle of the coal duct. This effects control of the coal distribution at the nozzle, e.g. in response to change of particle size distribution or load.

Preferably, in the coal duct upstream of the gradually reducing cross-section, the core portion has a diameter which is in the range 30 to 80% of outer diameter of the flow area in the coal duct.

Preferably the slowing means comprises at least one baffle located at the outlet nozzle of the coal duct so as to interrupt the flow at the outer zone. There may be a plurality of baffles spaced around the nozzle.

Preferably the baffle or baffles are shaped so as to give the flow from the coal duct substantially no swirling around its axis.

Preferably the baffle or baffles are spaced from the gradually reducing cross-section core portion by a distance less than the maximum width of said coal duct at its outlet nozzle.

If the baffle is disposed at about a right angle with respect to the mixture flow, the particles having collided have their flow velocity reduced and exhibit a velocity toward the centre of the pulverized coal nozzle and at a right angle with respect to the injection direction of the mixture. As a result, the hot particles and combustion gases in the ignition region formed at the outer circumference of the pulverized coal nozzle are mixed with the central portion of the pulverized coal jet injected from the pulverized coal nozzle, so that the ignitability of the pulverized coal at the central portion of the pulverized coal nozzle is improved. Particularly it is preferred, as seen in axial cross-section, that the baffle surfaces contacted by the coal duct are at an angle in the range 90° to 120° to the coal duct axis relative to the axial direction of flow. Thus, the baffle may be perpendicular to the flow or inclined slightly to the axis so as to divert the coal inwardly.

In one particular aspect, the invention comprises a burner for pulverizing coal comprising, (a) an annular coal duct for a flow of pulverized coal and primary air containing the coal, the coal duct having an outlet nozzle and an outer bounding wall and an inner bounding wall defining an annular flow passage for said flow, and (b) an annular secondary air duct surrounding the coal duct and having an outlet nozzle around the outlet nozzle of the coal duct, wherein (c) a portion of the inner bounding wall close to the outlet nozzle of the coal duct has a frusto-conical shape of diameter reducing in the flow direction along the coal duct, and (d) at least one baffle extending inwardly from said outer bounding wall at the outlet nozzle of the coal duct over a radial distance which is not more than 20% of the diameter of the outer bounding wall at the outlet nozzle.

In the present invention, moreover, preferably the combustion air comprises the igniting secondary air and tertiary air for the complete combustion. This is because the excess fuel combustion region is formed at the central portion of the flame to promote the reduction of the $NO_x$ by the secondary air and the mixture. In order to facilitate the formation of the excess fuel region, furthermore, it is effective to suppress the mixing between the secondary and tertiary air flow at the exit of the burner. In the present invention, a gap for suppressing this mixing may be interposed between the secondary and tertiary air passages. This gap can not only suppress the radial mixing of the tertiary air but also attract the hot combustion gases to the vicinity of the fuel nozzle by the swirling force of the tertiary air before the combustion gases flow into the burner, so that the pulverized coal ignitability is further improved.

To improve mixing with the coal, preferably the outlet nozzle of the secondary air duct has, at its side closer to the burner axis, a deflector adapted to give the secondary air an outward component of flow with respect to the axis.

The pulverized coal nozzle injects the relatively small pulverized coal particles from its central portion and the relatively large pulverized coal particles from its outer circumference. Thanks to these characteristics, the particle diameter distribution of the pulverized coal to be supplied to the pulverized coal, the burner can be estimated by measuring the sizes of the pulverized coal particles at the central portion and the outer circumference at the exit of the pulverized coal nozzle.

A signal indicating the diameter distribution of the pulverized coal supplied to the burner can be used to control the combustion. If the time change of this signal is used, for example, the particle diameter distribution at the exit of the coal pulverizer, in which the amount of the coal to be supplied fluctuates with the change in the load upon the boiler, can be controlled to a constant or desired value. When the pulverized coal is to be distributed from the single coal pulverizer to a plurality of burners, the granulation distribution of the pulverized coal to be supplied to the individual burners can be estimated to control the relation in the granulation distribution among the burners to a constant or desired state.

The invention also provides a boiler for heating water by combustion of pulverized coal having a combustion chamber for burning pulverized coal in air and means for heating said water as a result of the combustion of the pulverized coal, the combustion chamber including at least one burner of the invention as described above.

Since the pulverized coal burner of the present invention has excellent ignitability and flame holdability, it can establish a stable flame even under a light load run with a reduced pulverized coal supply so that a boiler using such burners can follow load variations well.

In another aspect, the invention provides a method of burning pulverized coal in a combustion chamber by means of a burner having a flow duct for pulverized coal and primary air containing said coal, a first outlet nozzle into the combustion chamber at an end of the flow duct and at least one second outlet nozzle more remote from the axis of the coal duct than the first nozzle for flow of secondary combustion air into the chamber adjacent the first nozzle, said method comprising, (a) effecting separation of flow in the coal flow duct into at least one outer zone of relatively higher concentration of coal in said primary air and at least one inner zone of relatively lower concentration of coal in said primary air, the inner zone being closer to the coal duct axis than said outer zone, (b) slowing the flow speed of the coal in the outer zone relative to that of the inner zone prior to mixing of the coal with the secondary air, (c) establishing a first flame zone adjacent the nozzles and a second flame zone more remote from the nozzles than said first combustion zone, the oxygen concentration in the second flame zone being lower than that in the first flame zone and being sufficiently low in the second flame zone that reduction of nitrogen oxides takes place therein.

The method preferably further includes providing a flow of tertiary combustion air from at least one third nozzle of the burner to at least the exterior of the second flame zone.

BRIEF INTRODUCTION OF THE DRAWINGS

Embodiments of the invention will now be described by way of non-limitative example with reference to the accompanying drawings, in which.

Figure 6:
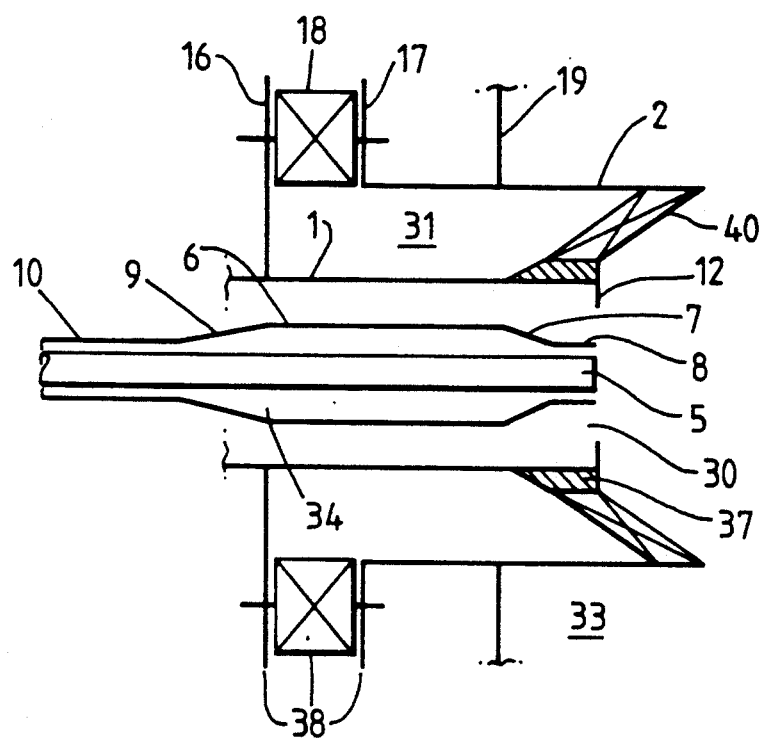
Figure 7:
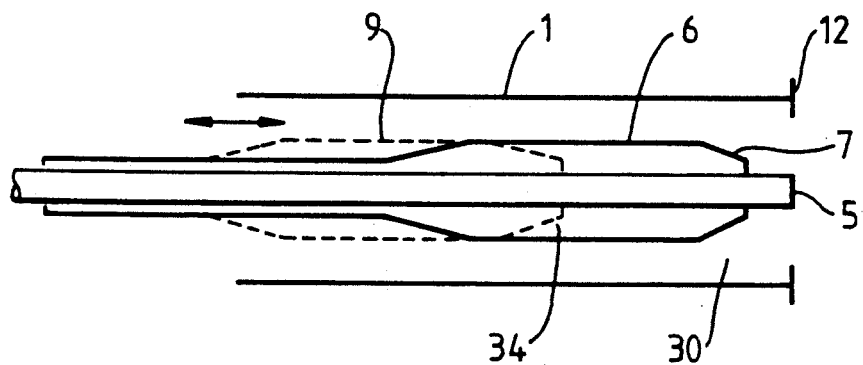
Figure 8:
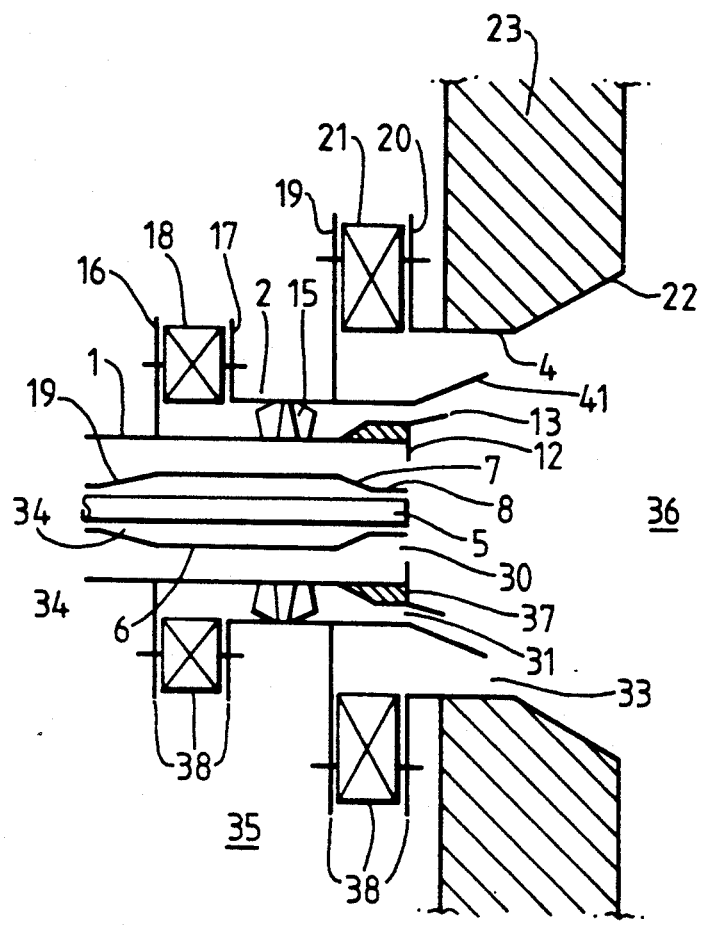
Figure 9:
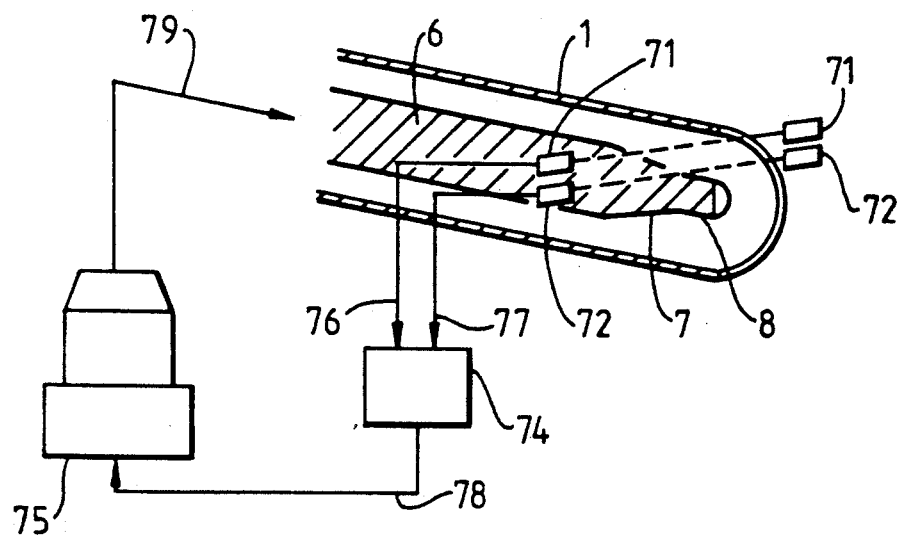
Figure 10:
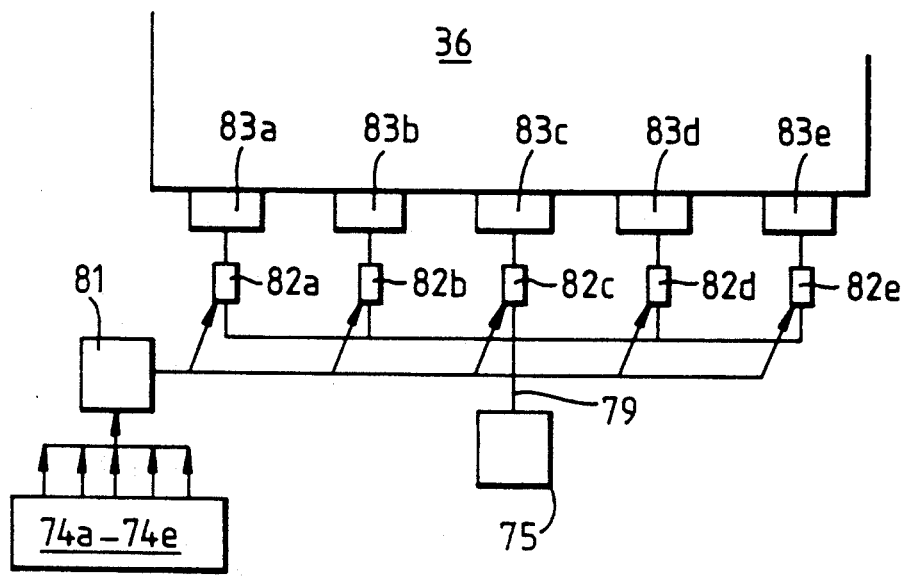
Figure 11:
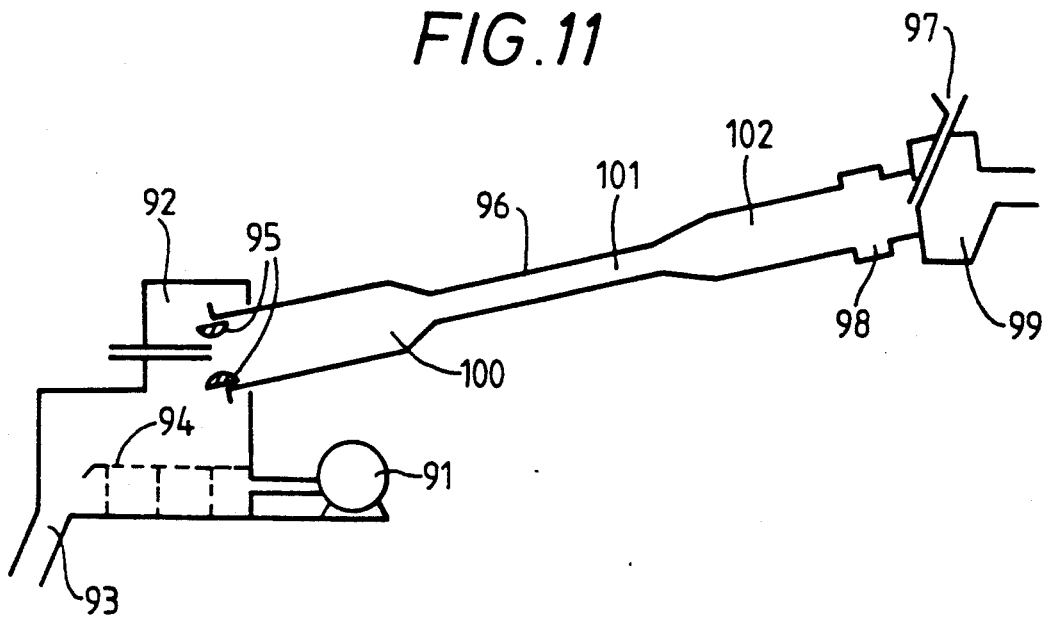

FIGS. 5(a) and 5(b) are graphs plotting the gas composition distributions in the flow direction during combustion using a pulverised coal burner according to another embodiment of the invention;

FIG. 6 is an axial cross-section showing a modified portion of a pulverised coal burner according to yet another embodiment;

FIG. 7 is a cross-section showing a modified portion of a pulverised coal burner of a fourth embodiment;

FIG. 8 is a cross-section showing a pulverised coal burner of a fifth embodiment;

FIG. 9 is a diagram showing a system for measuring and controlling the coal particle diameter distribution in a burner of the invention;

FIG. 10 is a diagram showing a system for measuring and controlling the coal particle diameter distribution to a plurality of burners; and FIG. 11 is a diagram showing a system in which the burner of the invention is applied to a rotary kiln for producing cement.

DESCRIPTION OF THE PREFERRED EMBODIMENTS

Figure 1:
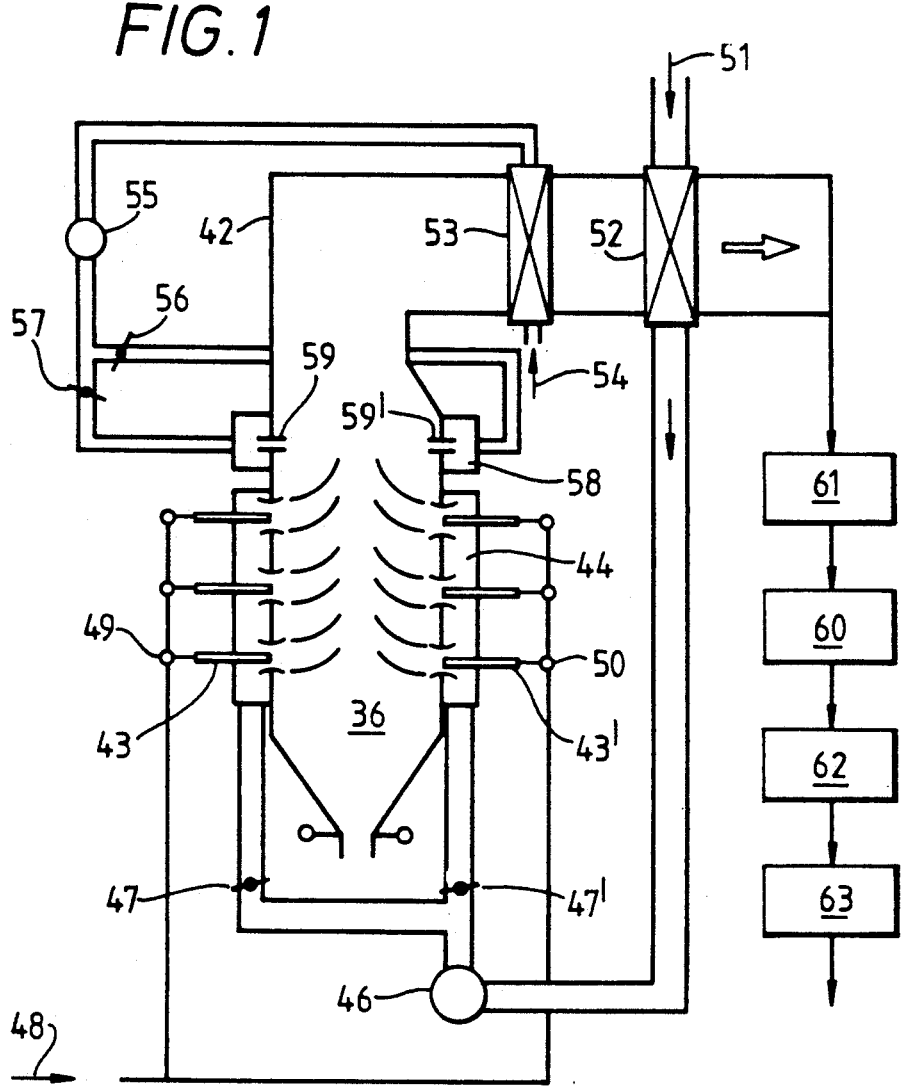
FIG. 1 is a diagram showing the general structure of a pulverised coal boiler system according to the present invention.

The structure of the pulverized coal boiler system will be described with reference to FIG. 1.

A pulverized coal boiler 42 according to the present embodiment is exemplified by a front facing type boiler, which has a burner array adopting two-stage combustion and after burning air inlet ports 58 (which will be called the "after air ports"). Burners 43 and 43' are arrayed in three stages in the longitudinal direction of the combustion chamber 42 and in five rows in the transverse direction of the combustion chamber 42 (this transverse array is not shown in FIG. 1). The number and array of the burners are determined in dependence upon the capacity of one burner (i.e., the maximum pulverized coal combustion rate) and the capacity and structure of the boiler. Typically, a large boiler may have as many as 60 burners.

The individual burners of the present invention are housed in a window box 44 and are so constructed that the pulverized coal is carried by an air flow from a coal pulverizer (not shown) and introduced into the burners through distributors 49 and 50. Combustion air 51 is heated by a heat exchanger 52 and has its flow rate regulated as heated air at about 300° C. through dampers 47 and 47' by a fan 46. After this, the regulated air flow is introduced into the window box 44 so that it may be injected through the individual burners into a combustion chamber 36. Secondary combustion air 54 (i.e. after-air) 54 is heated by a heat exchanger 53 and has its flow rate regulated as heated air at a temperature nearly equal to that of the primary air through dampers 56 and 57 by a fan 55. After this, the regulated air flow is introduced into the after air ports 58 so that it may be injected through nozzles 59 and 59' into the combustion chamber 36.

Downstream of the pulverized coal boiler 42, there are sequentially in the gas flow direction the heat exchanger 53, a denitrator 61, an electric collector 60 and a desulfurizer 62. The combustion exhaust gases are discharged through a chimney 63 to the atmosphere.

The combustion air to be supplied from the individual burners is 80 to 90% of the stoichiometric air required for the coal, and the after air is about 30 to 40% of the stoichiometric air required for the coal so that the total air is set to have an excess of about 20%. The burner combustion zone forms combustion flames of air shortage, but the combustion of the unburned content of the burner combustion zone is completed by the after air.

The pulverized coal burners of the present invention have excellent ignitability and flame holding properties so that the flames formed by the burners of the pulverized coal boiler can be remarkably shortened.

Figure 4:
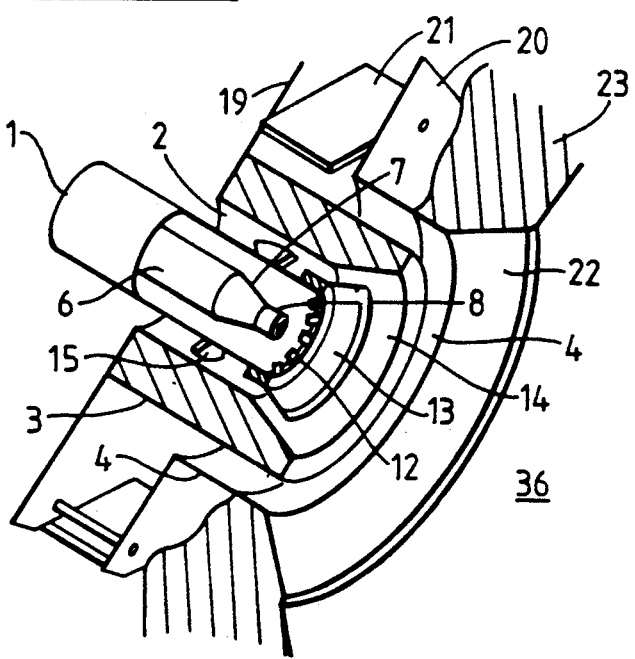
FIG. 4 is a partly sectional, partly cut-away perspective view onto the end of the burner of FIG. 2.
Figure 2:
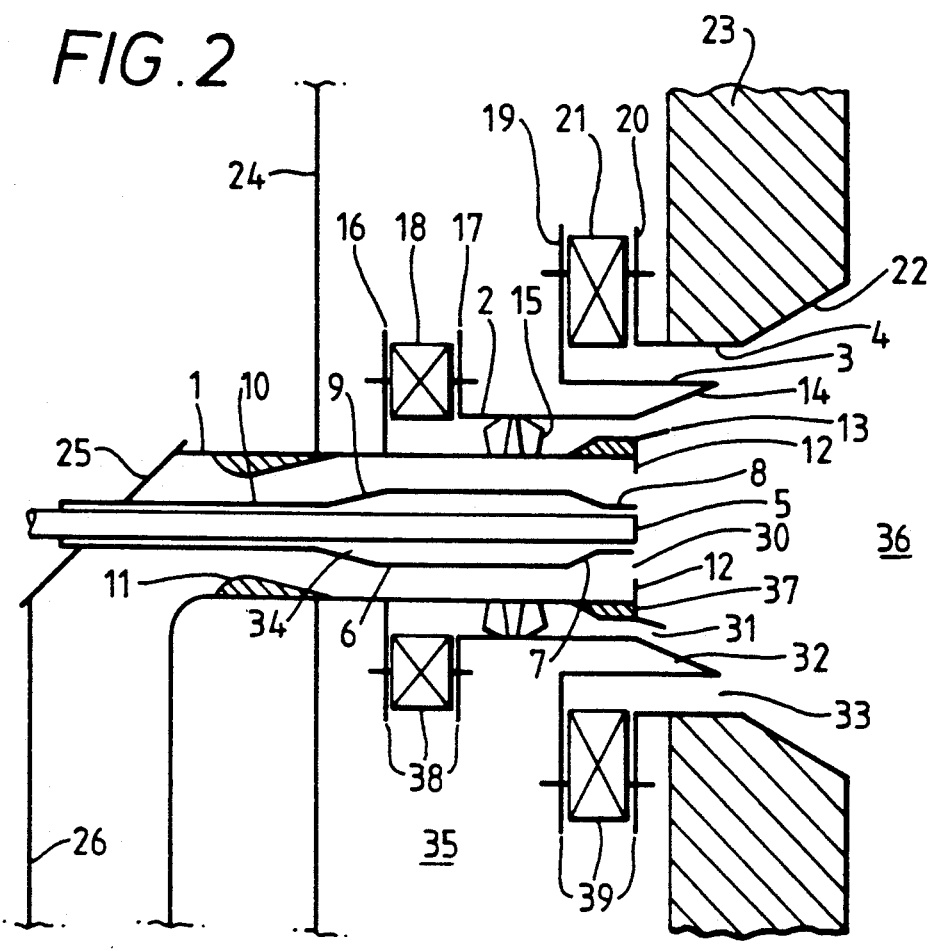
FIG. 2 is an axial cross-section showing a pulverised coal burner according to an embodiment of the present invention.
Figure 3:
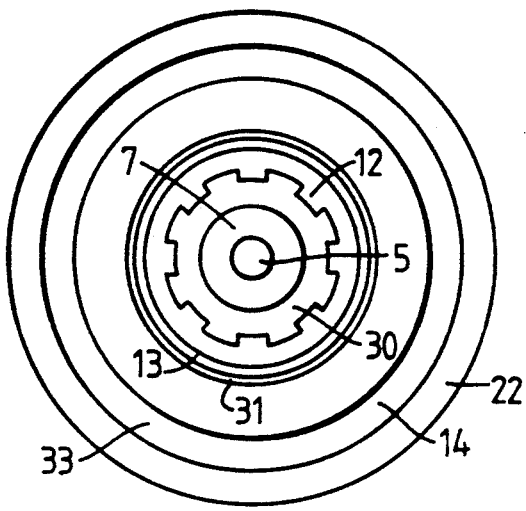
FIG. 3 is an end view of the burner of FIG. 2, from inside the combustion chamber.

FIGS. 2 to 4 show one embodiment of the pulverized coal burner of the present invention.

The burner is constructed of: a primary air passage (coal duct) 30 ending in an outlet nozzle for injecting the pulverized coal and primary air which entrains the pulverized coal into the combustion chamber 36; an annular secondary air passage 31 formed around the primary air passage 30 and ending in an outlet nozzle for injecting secondary air; and an annular tertiary air passage 33 formed around the secondary air passage 31 and ending in an outlet nozzle.

Within the primary air passage 30, there is arranged a liquid fuel nozzle 5 which is used for preheating the combustion chamber 36 by injecting a liquid fuel such as heavy oil in the preheating operation. Between the liquid fuel nozzle 5 and the primary air passage 30, there is interposed an atomization/dispersion adjustor 34 which is annular and determines the diameter of the inner circumferential wall of the primary air passage 30. This atomization/dispersion adjustor 34 is composed of a cylindrical tube portion 10 for holding the liquid fuel nozzle 5 therein, a cone 9 diverging toward the combustion chamber, a cylindrical tube portion 6 having a diameter equal to the maximum diameter of the cone 9, a cone 7 converging toward the combustion chamber, and a cylindrical straightening tube 8 having a diameter equal to the minimum diameter of the cone 7. All of these components are joined in the recited order toward the combustion chamber. The diameter of the portion 6 is in the range 30 to 80% of the diameter of the tube 1.

The primary air passage 30 is thus shaped as an annular flow passage by a cylindrical primary air supply tube 1 and the aforementioned atomization/dispersion adjustor 34, and has its upstream side connected to a pulverized coal supply pipe 26 for carrying the pulverized coal in an air flow from a pulverized coal supply system (not shown). This connection between the pulverized coal supply pipe 26 and the primary air supply tube 1 is made at an angle of about 90 degrees by means of a flat corner plate 25. This corner plate 25 holds the aforementioned liquid fuel nozzle 5 and the atomization/dispersion adjustor 34 in the centre of the primary air supply pipe 26. Moreover, the primary air supply tube 1 has in the vicinity of plate 25 a venturi 11 for smoothing the flow in the primary air supply tube 1 to homogenize the dispersion characteristics of the coal in the primary air passage 30.

The secondary air passage 31 is an annular flow passage which has its inner circumferential wall defined by the primary air supply tube 1 and its outer circumferential wall defined by a secondary air supply tube 2 which is arranged concentrically around the primary air supply tube 1. The secondary air passage 31 has its upstream side communicating with a window box 35, which is connected to air supply facilities for supplying the secondary and tertiary air flows, and its downstream side communicating with the combustion chamber 36.

The secondary air passage 31 is equipped with a secondary resistor 38, a secondary vane structure 15 and a flame holder 37. The secondary resistor 38 is composed of a vane side plate 17 connected to the upstream end face of the secondary air passage 2 and having an annular flat shape, a vane side plate 16 of annular flat shape arranged in parallel with the vane side plate 17 and having one end connected to the primary air passage 1, and vanes 18 interposed between the vane side plates 16 and 17. The vanes 18 are a plurality of flat plates supported on the vane side plates 16 and 17 by means of support pins made integral therewith. The vanes 18 thus have the function of adjusting the pressure loss by changing the angle of the flat plates by a control unit (not shown) thereby to introduce a predetermined flow rate of air into the secondary passage 31.

The secondary vane structure 15 is composed of swirl blades which are formed integrally with a plurality of support shafts having their two ends supported by the primary air supply tube 1 and the secondary air supply tube 2. The secondary vane structure 15 thus constructed can have its swirl blades angularly changed with respect to the air flow by a control unit (not shown) thereby to adjust the swirling intensity of the secondary air flow.

The flame holder 37 attached to the end face of the secondary air supply tube 2 at the combustion chamber side establishes a velocity toward the burner in the region of the flame holder 37 at the chamber side (i.e. a flow reversal outside the passage 30). The shape of the flame holder 37 may be any which satisfies the above-specified function, but may preferably, (as in the present embodiment) be composed of: a diverging portion of the inner circumferential wall of the flow passage 31 upstream of the outlet of the secondary air passage 31; a primary throat 13 having its outer circumference diverging toward the combustion chamber; and a plurality of plate-shaped baffles 12 having the function of causing part of the primary air to collide with the edge of the mouth of the primary air passage 1. This causes slowing of an outer zone of the primary airflow, as described more below.

FIGS. 3 and 4 show that the baffle plates 12, in this case eight in number, are rectangular and are uniformly spaced around the circumference of the air passage 30, with gaps between them. Preferably the number of plates 12 is in the range 6 to 16. The height of each plate 12, i.e. its radial projection into the passage 30, is preferably less than 20% of the overall diameter of the passage 30 at its exit end, preferably in the range 0.01 to 0.15 times this diameter. In the present case the height of the plate 12 is 10% of the diameter of the passage 30. The circumferential length of each plate 12 is preferably in the range 0.2 to 5 times its height, being in the present embodiment about twice its height. The baffle plates 12 are at 90° to the axis of the passage 30, but may be inclined outwardly (towards the combustion chamber) from the radially outer sides at an angle of preferably up to 30° to the position shown in FIG. 2, i.e. at an angle in the range 90° to 120° to the axial direction of flow in the passage 30.

The tertiary air passage 33 is shaped as an annular passage section having its inner circumferential wall defined by a tertiary air supply tube 3 arranged concentrically around the secondary air supply tube 2 and its outer circumferential wall defined by an outer tube 4 arranged concentrically around the tertiary air supply tube 3. The tertiary air passage 33 thus constructed has its upstream end communicating with the window box 35 and its downstream end communicating with the combustion chamber 36. Upstream of the tertiary air passage 33, there is arranged a tertiary resistor 30 which has a structure similar to that of the secondary resistor 38 such that it is composed of two sheets of tertiary vane side plates 19 and 20 and tertiary vanes 21. The tertiary resistor functions to set the swirling intensity an flow rate of the air by a control unit (not shown).

Between the secondary air flow passage 31 and the tertiary air flow passage 33, there is interposed a gap or partition 32 which is arranged to position the two air passages at a radial spacing from each other. The partition 32 is shaped to suppress the mixing of the tertiary air and the secondary air. The partition 32 has a width sufficient for forming an excess fuel region, and is shaped to minimize damage due to the radiation of the flame. The partition 32 of the first embodiment corresponds to a secondary throat 14 having its external diameter-diverging toward the combustion chamber and has its chamber side end connected to the tertiary air supply tube 3 and its other end connected to the secondary air supply tube 2.

The burner having the features thus far described is housed in the window box 35, which is defined by a chamber inner wall 23 and a window box side plate 24, and has its chamber side opening connected to a tertiary throat 22 formed in the chamber inner wall.

The pulverized coal typically passes at a velocity of about 30 m/s through the atomization/dispersion adjustor 34 so that the portion it collides with is worn and deformed to raise a problem of lack of reliability in the long run. In order to avoid this problem, those inner circumferential walls of the cone 9 and the straightening tube 8 of the atomization/dispersion adjustor 34 and the primary air passage 1, which are hit by the coal particles, are covered with films of ceramics for abrasion resistances.

Next, the operation of this embodiment will be described.

The shape of the atomization/dispersion adjustor 34 of the present embodiment accelerates the pulverized coal in the primary air flow passage 30, so that it passes at high speed through the annular passage having a small sectional area bounded by the tube portion 6, to prevent the flame from entering the primary air passage. At the converging portion 7 of the atomization/dispersion adjustor 34 (i.e. a portion a gradually decreasing cross-section) at the combustion chamber side, the primary air jet carrying the pulverized coal is radially expanded inwardly so that its injection velocity dropped Fine particles can be carried inwardly, but the pulverized coal particles having relatively large diameters are reluctant to follow the air flow because of their inertia so that they are not spread as wide as the air flow. As a result, there is formed a zone or region having a higher pulverized coal concentration near the outer circumference of the primary air passage 30 and a zone or region having a lower pulverized coal concentration near the inner circumference of the primary air passage 30. The preferred cone angle of the portion 7 of decreasing cross-section is in the range 10° to 45°.

The straightening tube 8, which is located closest to the combustion chamber, attenuates the velocity of the air in the radial direction of the burner caused by the cone 7 so that the velocity in the axial direction of the burner may be mainly exhibited to reduce the interference between the liquid fuel atomized by the liquid fuel nozzle 5 and the primary air thereby to prevent the misfire of the liquid fuel flame when the combustion chamber is preheated.

The baffle plates 12 of the flame holder 37 are hit by the jet of the higher pulverized coal concentration described above. The pulverized coal particles colliding with the baffle plates 12 have their velocities reduced but retained in the direction perpendicular to that of the injection of the mixture so that they are likely to come into the ignition region which is formed at the combustion chamber side of the flame holder 37. The coal has substantially no radially outward component of flow. The baffle plates 12 also give no general swirling motion to the coal.

The primary throat 13 operates to stabilize establishment of the gas flow at the chamber side of the flame holder 37 toward the burner.

The secondary air supplied from the secondary air passage 31 is injected in a swirling manner from the secondary vanes 15 to adjust both the dispersion of the pulverized coal jet, which is condensed at the mouth of the primary air passage 30, in the radial direction and the ratio between the air and the pulverized coal in the combustion region of excess fuel at the centre of the flame. The secondary air flow rate is adjusted according to the flow rate of the pulverized coal poured into the burner, the ratio between the solid carbon and the volatile component of the pulverized coal (as will be generally called the "fuel ratio", at the higher value of which the ratio of the solid carbon increases the more) and the particle size distribution of the pulverized coal. In other words, the flow rate of the secondary air is decreased, while retaining the intensity of the swirling flow, with the reduction of the flow rate of the pulverized coal, the increase in the fuel ratio, and the increase in the ratio of the larger particles.

The tertiary air supplied from the tertiary air passage 33 is injected in the swirling flow from the tertiary resistor 39 into the combustion chamber. Since the swirling flow of the tertiary air has a lower pressure at the central portion near the burner than in the combustion chamber, it sucks the combustion gases, which are produced at high temperature by the flame, back to the vicinity of the burner thereby to improve the ignitability of the pulverized coal. Moreover, the swirling flow of the tertiary air suppresses the mixing between the tertiary air and the pulverized coal jet near the burner, thereby to form the aforementioned combustion region of excess fuel stably. The partition 32 increases the distance between the tertiary air and the pulverized coal jet to suppress the radial mixing of the tertiary air in the vicinity of the burner thereby to stabilise the combustion region of excess fuel.

Next, the effects of the embodiment will be described.

The zone of higher pulverized coal concentration which is established near the outer circumference of the primary air passage 30 by the atomization/dispersion adjustor 34, increases the calorific value per volume flow near the flame holder to improve the ignitability so that it is effective to raise the flame temperature around the region of excess fuel.

The particles in the zone of lower particle concentration established near the inner circumference of the primary air passage 30, are heated by the hot flame near the outer circumference to promote the pyrolysis in the region of excess fuel. As a result, the release of hydrogen cyanide, ammonia and so on in the hot atmosphere of low oxygen concentration is increased to promote the reduction of $NO_x$ produced at the initial stage of the combustion so that the concentration of the $NO_x$ discharged at the exit of the combustion chamber is reduced.

Generally speaking, the pulverized coal passing through the central portion of a flame has its mixing with the tertiary air retarded so that its oxidization is accordingly retarded. As a result, the amount of the fuel discharged as unburned from the exit of the combustion chamber is liable to increase. In the vicinity of the inner circumference of the primary air passage 30, however, the flow rate of the pulverized coal per unit volume is reduced, and only the fine particles capable of following the air flow through the abruptly diverging portion are supplied, as has been described according to the present invention. As a result, the reactivity of the particles at the central portion of the flame is improved to avoid any increase in the unburned fuel at the exit of the combustion chamber.

The straightening tube 8 attenuates the velocity of the air in the radial direction of the burner caused by the action of the cone 7, so that the velocity in the axial direction of the burner may be mainly exhibited to reduce the interference between the liquid fuel atomized by the liquid fuel nozzle 5 and the primary air. As a result, there is attained an effect that the flame of the liquid fuel is prevented from any misfire while the combustion chamber is being preheated.

The baffle plates 12 of the flame holder 37 baffles the flow zone having a high pulverized coal concentration, to reduce the flow velocity of the pulverized coal particles which hit the baffle plates 12 and to establish a flow velocity at a right angle with respect to the injection direction of the mixture thereby to supply the pulverized coal particles to a circulating flow established at the combustion chamber side of the flame holder 37. There arises another effect that the ignitability of the vicinity of the flame holder is improved.

The primary throat 13 stably establishes the circulating flow at the combustion chamber side of the flame holder 37 so that the ignitability of the vicinity of the flame holder 37 is further improved.

The secondary air supplied from the secondary air passage 31 adjusts both the radial dispersion of the pulverized coal jet condensed at the mouth of the primary air passage 30 and the ratio between the air of the combustion region of excess fuel at the central portion of the flame and the pulverized coal. Thus, there arise optimum conditions for the oxidization by the oxygen and water vapour of the pulverized coal particles and for the reduction of $NO_x$.

The swirling flow of the tertiary air reduces the pressure in the central portion near the burner to a lower level than that in the combustion chamber to extract the hot combustion gases produced by the flame in the vicinity of the burner. Thus, there arises an effect that the ignitability of the pulverized coal is improved. Moreover, the swirling flow of the tertiary air suppresses the mixing between the tertiary air in the vicinity of the burner and the pulverized coal jet, so that the combustion region of excess fuel is stably established in the flame.

The partition 32 reduces the difference between the static pressures in the inside of the window box 35 and the combustion chamber 36, which is necessary for injecting the tertiary air having the above-specified effect, to about one half, to achieve an effect that the power for the facilities to supply the combustion air is reduced.

FIGS. 5(a) and 5(b) plot the distributions of gas compositions at the centre axis of the burner in the combustion chamber at the time of combustion using the burner of the present embodiment. FIG. 5(a) presents the $NO_x$ concentration and the combustion rate of the pulverized coal, and the lower diagram presents the concentrations of oxygen, carbon dioxide, carbon monoxide and hydrogen. The burner of the embodiment was subjected to the combustion under the following conditions: the pulverized coal was burned at a rate of 500 Kg per hour; the burner was supplied with air in an amount of about 0.8 times the stoichiometric amount necessary for burning the fuel; and air (called the "after air") was added to give an oxygen concentration of about 2% at the exit of the combustion chamber, at the position of a chamber residence time of about 0.4 s from the burner.

The running conditions of the burner were that the weight flow ratio of the pulverized coal and the air for a unit time was about 0.5, and that the ratios of the primary, secondary and tertiary air flows were in a ratio of about 2:1:4. The primary air had the injection velocity of about 20 m/s at a preheating temperature of about 80° C. The secondary and tertiary air flows had a preheating temperature of about 300° C., and the secondary air flow had an injection velocity of about 26 m/s whereas the tertiary air flow had an injection velocity of about 50 m/s.

The sample pulverized coal had a particle diameter distribution of 80 to 84% by weight of particles of 74 µm or less, a fuel ratio of about 2.1, a weight of about 1% of nitrogen component in the fuel, and a weight of about 8% of ash content.

In view of an oxygen concentration of about 1% and a combustion rate of about 55% at the position 1 m from the burner, it was found that the ignitability of the pulverized coal near the burner was excellent. In view of a concentration of carbon monoxide of about 8% and a hydrogen concentration of about 2%, it was found that the combustion region of excess fuel is rapidly established. On the other hand, the $NO_x$ concentration as high as about 1,000 ppm at the initial stage of the combustion was reduced to about 200 ppm, and this reduction had already occurred at the position of 1 m. In short, the atomization/dispersion adjustor 34 and the baffle plates 12 used in the present embodiment could realize the suitable pulverized coal dispersion characteristics for promoting the ignition and establishing the fuel excess region.

The oxygen concentration slightly rose at the position of 2 m from the burner. This is thought to result because the mixing between the tertiary air and the fuel excess region has started. The region to the position of 4 m, at which introduction of the after air occurs, corresponds to the region for combustion of the pulverized coal and for conversion of the released nitrogen component to nitrogen.

As a result of the ignition promotion of the pulverized coal by the atomization/dispersion adjustor 34 and the baffle plates 12, the gas temperature of the excess fuel region is raised to promote the reactions between the pulverized coal and the water vapour. As a result, the combustion rate of the pulverized coal reaches about 90% at the position of about 4 m despite the fact that the amount of air supplied to the burner is about 0.8 times the stoichiometric value, so that the nitrogen component released together with the unburned content of the pulverized coal is converted to nitrogen before the additional supply of the after air. Since the combustion rate reaches about 90% at the time of supply of the after air, little nitrogen content is left in the fuel particles so that the $NO_x$ which might otherwise be produced in the wake of the after air is not observed.

The $NO_x$ concentration of the burner of the present embodiment was about 110 to 120 ppm (as converted into the oxygen concentration of 6%) at the position of about 1.4 s from the burner, and the unburned content in the ash content was about 2% by weight.

Another embodiment of the present invention is shown in FIG. 6. FIG. 6 shows the portions different from the structure of the burner of FIGS. 2 to 4 but omits the portions which are the same. The burner of FIG. 6 is characterized in the structure in which the secondary vanes and the partition are made common.

The secondary air passage 31 is formed as an annular passage which is defined by both the primary air supply tube 1 providing the outer circumference of the primary air passage 30 and the secondary air supply tube 2 providing the inner circumference of the tertiary air passage 33. The secondary air passage 31 has its upstream side communicating with the window box 35 through the secondary resistor 38 and its downstream side communicating with the combustion chamber 36 through a secondary air swirler 40. This secondary air swirler 40 is composed of a plurality of rectangular plates each having one end connected to the flame holder 37 and its other end connected to the end face of the secondary air supply tube 2 positioned closer to the combustion chamber than the flame holder 37. These rectangular plates, i.e. the swirl blades, are attached to overlap the adjoining ones in the injection direction of the pulverized coal and are so arranged that the secondary air is allowed to pass through the clearances of the overlapping blades in a manner to have a velocity not in the injection direction of the pulverized coal but only in the swirling direction.

Next, the operation and effects of the present embodiment will be described.

The passages of the clearances of the swirling blades constituting the secondary air swirler 40 give the secondary air no velocity in the injection direction of the pulverized coal but velocity in the swirling direction. As a result, the secondary air swirler 40 has a function equivalent to that of the partition 32 of FIGS. 2 to 4 to extract the hot combustion gases of the pulverized coal flame at the vicinity of the burner thereby to promote the ignitability of the pulverized coal.

The secondary air contacts the surfaces of the swirling blades of the secondary air swirler 40 to cool down the swirling blades. As a result, the combustion loss caused by the hot flame established in the vicinity of the burner can be prevented to improve the reliability of running in the long term.

FIG. 7 shows a modification of the pulverized coal burner of the present invention, and is characterized in that the atomization/dispersion adjustor 34 can move in the injection direction of the pulverized coal (axial direction).

The atomization/dispersion adjustor 34 is constructed of the cylindrical tube portion 10, the cone 9, the cylindrical tube portion 6 and the cone 7 which are integrally formed in the recited order from the upstream end. The protruding portion of the liquid fuel nozzle 5, which protrudes from the combustion chamber end face of the atomization/dispersion adjustor 34 toward the combustion chamber, corresponds to the straightening tube 8 exemplified in FIGS. 2 to 4.

The position of the atomization/dispersion adjustor 34 is varied in the injection direction of the pulverized coal in response to a control signal. This control signal is exemplified by: a signal containing information on the flow rates of the pulverized coal and the carrier air; a signal indicating the supply ratio of the combustion air divided into three portions and supplied to the burner; a signal containing information such as the shape of the flame or the like; and a signal indicating the state of the burner or combustion chamber such as a signal of a variety of pieces of temperature information.

Next, the operation and effects of the embodiment of FIG. 7 will be described.

The atomization/dispersion adjustor 34 is moved in the injection direction of the pulverized coal to change the length of the protruding portion (which corresponds to the straightening tube 8) of the liquid fuel nozzle 5 toward the combustion chamber so that the dispersion characteristics of the pulverized coal at the exit of the primary air passage are controlled. Specifically, the redistribution of the pulverized coal particles, which are concentrated in the vicinity of the inner face of the primary air supply tube 1 by the atomization/dispersion adjustor 34, in the radial direction of the passage are increased with the increase in the length of the aforementioned straightening tube so that the radial distributions of the particle diameters or concentrations of the pulverized coal particles at the combustion chamber side end of the primary air passage 30 are smoothed. If the aforementioned straightening tube is shortened, on the contrary, the pulverized coal concentration in the outer zone at the mouth of the primary air passage 30 can be raised.

Generally speaking, during a run under a low load with a low pulverized coal supply, the particle concentration of the pulverized coal is more lean because of the running characteristics of the coal pulverizer, so that the ignitability in the vicinity of the flame holder is deteriorated to establish no stable flame. If the atomization/dispersion adjustor 34 is operated in response to the signal indicating the features of the combustion state, the combustion characteristics of the burner can be improved. For example, if the signal in dictating the pulverized coal supply rate is used to reduce the pulverized coal supply rate and to move the atomization/dispersion adjustor 34 toward the combustion chamber, the pulverized coal concentration at the mouth of the primary air supply tube 1 is held substantially at a constant level irrespective of the supply rate of the pulverized coal. As a result, the minimum load of the single burner can be reduced to about one half of that of the prior art, i.e. about 15 to 20%.

These operations and effects could likewise be attained even if the atomization/dispersion adjustor were attached to a pulverized coal nozzle of any shape although the atomization/dispersion adjustor of FIG. 7 is disposed in the pulverized coal nozzle of the cylindrical tube. For example, even in a combustion method in which a plurality of rectangular nozzles are stacked in the height direction of the combustion chamber so that the pulverized coal and the carrier air or the combustion air are injected from the individual nozzles, the particle concentration and diameter of the pulverized coal at the exit of the nozzles can be adjusted to achieve the object of the present invention if the atomization/dispersion adjustor is disposed in the pulverized coal carrier nozzles.

FIG. 8 shows another embodiment and illustrates only the portions which are different in structure from the burner of the FIGS. 2 to 4 but omits the common portions This embodiment is characterized by a guide sleeve 41 at the leading end of the secondary air supply passage 2 in place of the partition 21, as shown in FIGS. 2 to 4, in order to suppress the mixing between the pulverized coal jet and the tertiary air.

The guide sleeve 41 defines the tertiary air passage 33 adjacent the combustion chamber 36 like the second throat 14 of FIGS. 2 to 4. In FIG. 8, the tertiary air passage 33 is constructed to have its sectional area reduced towards the combustion chamber 36 by the guide sleeve 41.

Next, the operation and effects of this embodiment will be described.

Since the guide sleeve 41 of the present embodiment is constructed to reduce the tertiary air passage 33 at the leading side (i.e. combustion chamber side), the tertiary air jet can be injected along the tertiary throat 22 to suppress the mixing between the tertiary air and the pulverized coal flow immediately after the injection of the tertiary air so that the guide sleeve 41 can perform an operation similar to that of the partition 32 of FIGS. 2 to 4. As a result, a region of lower air/fuel ratio can be established at the central portion of the flame and in the vicinity of the burner, thus achieving the effect that the reduction of the $NO_x$ produced at the initial stage of the combustion can be promoted. In the present embodiment, moreover, another effect of executing stable ignition and flame holding even under a light load can also be attained by moving the atomization/dispersion adjustor 34 in accordance with the load as in FIG. 7.

Another embodiment of the present invention is shown in FIG. 9. FIG. 9 also illustrates only the portions which are different in structure from the burner of FIGS. 2 to 4 but omits the common portions. This means for measuring the particle diameter distribution of the pulverized coal to be injected from the pulverized coal nozzle, at the combustion chamber side downstream of the atomization/dispersion adjustor attached to the pulverized coal nozzle. The detector is constructed of: a larger particle diameter detector 71 for measuring the particle diameters in the vicinity of the inner face of the primary air supply tube 1; a smaller particle diameter detector 72 for measuring the particle diameters in the vicinity of the radially inner side of the passage 30; a particle diameter distribution detector 74 for estimating the particle diameter distribution of the supplied pulverized coal on the basis of an output signal 76 (i.e. a larger particle diameter signal) of the larger particle diameter detector 71 and an output signal 77 (i.e. a smaller particle diameter signal) of the smaller particle diameter detector 72; and a pulverizer 7 for adjusting the particle diameter distribution of the pulverized coal on the basis of an output signal 78 (i.e. a particle diameter distribution signal) of the particle diameter distribution detector 74. The larger particle diameter detector 71 and the smaller particle diameter detector 72 are exemplified by non-contact type detectors making use of the optical scattering or transmissions or contact type detectors for detecting the magnitudes of the resistances due to the collisions of the particles.

Next, the operation and effects of this embodiment will be described.

Since the primary air passage 30 has its effective area enlarged at its downstream end, the atomization/dispersion adjustor 34 can make use of the inertias of the pulverized coal particles to change the particle diameter distribution of the pulverized coal in the radial direction of the primary air passage 30 between the smaller particles willing to follow air flow and the larger particles reluctant to follow the air flow. The particle diameters of the pulverized coal reluctant to follow the carrier air are changed in dependence upon the carrier air velocity at the position, of the cylindrical tube portion 6 in the primary air passage 30, and the shape of the cone 7 at the downstream side. The minimum diameter failing to follow the carrier air (which diameter will be called the "lower separation limit particle diameter") is about 20 to 50 $\mu m$ for a carrier air velocity of 20 to 30 m/sec. at the position of the cylindrical tube portion 6, for an apex angle of the cone 7 of 10 to 60 degrees and under the condition of no separation of the carrier air in the tube. Specifically, the particle diameter distribution of the pulverized coal at the position of the straightening tube 8 is examined in the radial direction. Then, what is observed near the central portion of the primary air passage 30 is the finer coal particles having the lower separation limit particle diameter or less. Near the inner face of the primary air supply tube 1, on the contrary, the ratio of the larger diameter coal over the lower separation limit particle diameter is higher than the particle diameter distribution of the pulverized coal in the pulverized coal supply tube 26.

The aforementioned difference in the particle diameter distribution of the pulverized coal is detected by means of the larger particle diameter detector 72. These two detectors need not detect the particle diameter distribution of the pulverized coal accurately but can achieve their object if they can observe the relative values at the two detection positions. The detectors can be exemplified by the aforementioned non-contact and contact types. In order to establish the pulverized coal flame stably, however, the non-contact type detectors are preferable because they less disturb the flow rate distribution of the pulverized coal at the exit of the primary air passage 30.

The particle diameter distribution detector 74, which receives the output signals 76 and 77 of the two detectors 71 and 72, analyzes the intensity ratio and intensities themselves of the output signals on the basis of the calibration curves of the detectors 71 and 72 to estimate the particle diameter distribution of the pulverized coal in the pulverized coal supply tube 26. The output signal 75 of the particle diameter distribution detector 74 is outputted to the pulverizer 75 to control the particle diameter distribution of the pulverized coal to be supplied from the pulverizer 75.

In the method described above, the controls are effective for stabilizing the pulverizing characteristics of the pulverizer 75 when the load upon the boiler is fluctuating. If, for example, the load upon the pulverized coal boiler is changed by a large amount, the supply rate of the coal to be supplied for a unit time by the pulverizer 75 is accordingly also changed by a large amount. The change in the supply rate of the coal pulverizer 75 can be coped with by temporarily discharging the pulverized coal which has been held in the pulverizer 75, but the particle diameter distribution is generally changed. If the pulverizing characteristics of the pulverizer 75 are controlled as described with reference to FIG. 9, the particle diameter distribution of the pulverized coal to be supplied to the burner can be held constant irrespective of the change in the load upon the boiler so that the influences of the pulverized coal particle diameter for determining the state of the pulverized coal flame can be held with respect to the load. As a result, neither the unburned content in the ash nor the $NO_x$ concentration at the exit of the combustion chamber are changed with the change in the load upon the boiler.

According to this embodiment, moreover, the pulverizer 75 can be operated to reduce the particle diameter of the pulverized coal under a low temperature condition of the combustion chamber so that the combustion rate of the pulverized coal is not reduced even under a low load condition of the boiler.

Although there has been described a method of using the pulverized coal burner to measure the particle diameter distribution of the pulverized coal, the operations of the present embodiment can be added to the pulverized coal supply tube 26. Specifically, similar effects can be achieved if the pulverized coal supply tube 26 is abruptly diverted to establish the flow of smaller particles capable of following the flow of the carrier air and the flow of larger particles reluctant to follow the carrier air flow and if the particle diameter detectors for measuring the particle diameters of the individual flows are attached.

It is needless to say that the tubes should be shaped to avoid no accumulation of the pulverised particles in the diverging portion.

Another embodiment of the present invention is shown in FIG. 10, in which a plurality (e.g. five, as shown) of burners are attached to the combustion chamber 36. The burners 83a to e have the function of measuring the particle diameter distributions of the pulverized coal, as has been described with reference to FIG. 9. The pulverizer 75 supplies the pulverized coal to the burners 83. A particle diameter controller 81 receives the signals of the particle diameter distribution detectors 74 and decides the difference in the particle diameter distribution between the individual burners 83 to output a signal for controlling the particle diameter distribution. Particle diameter adjustors 82a to e attached to the pulverized coal supply tube upstream of the burners control the particle diameter distribution of the pulverized coal to be supplied to the burners, on the basis of the output signal of the particle diameter controller 81.

The particle diameter controller 81 decides the particle diameter distribution of the pulverized coal supplied to the burners 83 and compares it with the ideal pattern of the particle diameter distribution of each of the burners, to output a signal for causing the pattern to coincide with the ideal pattern of the particle diameter distribution of each burner to the particle diameter adjustors 82.

In response to the signal of the particle diameter controller 81, the particle diameter adjustors 82 control the particle diameter distributions of the pulverized coal to be fed to the burners 83.

The particle diameter adjustor 81 can reduce the unevenness of the particle diameter distribution, which is established when the single pulverizer 75 is used tp supply the plural pulverized coal burners 83. As a result, the combustion at the pulverized coal burners can be uniform to suppress the increase in the unburned contents which are produced by supplying the larger particles only to one or more specific burners as in the prior art.

When the pulverized coal is to be supplied from the single pulverizer 75 to the plural pulverized coal burners, the particle diameter adjustor 81 operates to supply the pulverized coal containing relatively smaller particles to the burners (82a and 82e) near the chamber wall and the remaining pulverized coal to the burners (83b to 83d) at the central portion of the combustion chamber 36. As a result, the burners positioned near the chamber wall can be prevented from having their combustion pattern deteriorated. This deterioration might otherwise be caused because the burners positioned near the chamber wall at a lower temperature receive less radiation from the flame than the pulverized coal burners disposed at the central portion of the combustion chamber. Thus, the combustion rates of the pulverized coal burners can be made substantially even.

Another embodiment of the present invention is shown in FIG. 11. In this embodiment, the burner described in FIGS. 2 to 4, is applied to a powder-producing kiln, in particular a rotary kiln for producing cement. The apparatus is constructed of: a blower 91; a product recovery chamber for holding combustion air supplied from the blower 91 and cooling and drying the cement powder produced; a cooling shelf 94 held in the product recovery chamber 92 for causing the air supplied from the blower 91 to pass upward through the cement powder; a discharge pipe 93 attached to a portion of the product recovery chamber 92 for recovering the cement powder; a burner 95 mounted in the product recovery chamber 92 for injecting the combustion air and the pulverized coal; a calcining rotary kiln 96 for receiving the flame formed by the burner; a discharge chamber 99 disposed at the opposite side to the produce recovery chamber across the rotary kiln 96; a slurry injection port 97 extending into the discharge chamber 99 for supplying the slurry as the material for producing the cement powder to the rotary kiln 96; and a discharge pipe connected to a portion of the discharge chamber 99 for discharging the combustion exhaust gases. On the other hand, the cylindrical rotary kiln 96 is composed of: a combustion chamber 100 having an enlarged internal diameter and disposed near the burner; a cylindrical calcination chamber 101 formed to extend from the combustion chamber 100 toward the discharge chamber and having a smaller internal diameter than that of the combustion chamber 100; and a heat recovery chamber 102 formed to extend from the calcination chamber 101 toward the discharge chamber and having an internal diameter substantially equal to that of the combustion chamber 100. The rotary kiln 96 is rotated by a constant speed turning mechanism (not shown).

The burner 95 is of the construction described above with reference to FIGS. 2 to 4, or as modified in accordance with FIGS. 6 to 9.

Next, the operation and effect of this apparatus is as follows:

The material for the slurry cement powder, which has been pulverized by the pulverizer and prepared, is supplied through the slurry injection port 97 to a slurry preheater 97 so that it is preheated by the contact with the combustion exhaust gases. The material passing over from the slurry preheater 98 is further heated by the accumulated heat of a metal chain depending in the heat recovery chamber 102. After this, the heated material is calcined in the calcination chamber 101 and then exposed to the radiations of the flame established in the combustion chamber 100. After this, the calcined material is cooled down on the cooling shelf 94 by the combustion air and then conveyed to the product reservoir through the discharge pipe 93. The coal having been pulverized by a pulverizer is carried by the air flow and supplied to the burner 95. On the other hand, the combustion air is supplied by the blower 93 and is heated by cooling down the cement powder before it is supplied to the burner 95.

The burner of the present embodiment can shorten the flame of the pulverized coal to reduce the $NO_x$ concentration to be discharged. Thus the ratio of the combustion chamber 100 occupying the calcining rotary kiln 96 can be increased to elongate the calcination chamber 101 relatively. As a result, the rate of the material for the cement powder to be treated can be increased for an equal size. Even in the calcining combustion kiln incapable of using the two-stage combustion, moreover, the $NO_x$ concentration contained in the exhaust gases can be reduced to drastically reduce the need for counter-measures to lower $NO_x$ content for the protection of the environment.

The present invention has been described in connection with the burner in which the nozzles for the combustion airare is disposed concentrically around the pulverized coal nozzle. However, other shapes are possible, for example rectangular nozzles, with secondary and tertiary air nozzles on both sides of a central coal nozzle. A core corresponding in shape to the atomization/dispersion adjustor of FIGS. 2 to 4 is provided, to achieve the same effects.

In summary, the pulverized coal boiler and the boiler system which is equipped with the plural stages of pulverized coal burners of the invention each having the mechanism for making the injection velocity of the solid particles lower than that of the gases at the mixture injecting exit of the pulverized coal nozzle for injecting the mixture jet of the pulverized coal and the coal carrying primary air, it is possible to suppress the amount of the $NO_x$ to be produced by the combustion of the pulverized coal.

What is claimed is:

1. A burner for pulverized coal comprising:
    a coal duct for pulverized coal and primary air entraining said coal in a flow along said coal duct, said coal duct having an axis and an outlet nozzle at one axial end thereof;
    at least one secondary air duct for secondary air for combustion of said coal having an outlet nozzle adjacent said outlet nozzle of said coal duct, such that said coal and primary air and said secondary air mix outside said nozzles in a mixing zone at which combustion occurs;
    coal distribution means in said coal duct for providing in said flow, along said coal duct adjacent said outlet nozzle thereof, at least one outer zone spaced from said axis having a higher concentration of said coal in said primary air and at least one inner zone nearer said axis than said outer zone having a lower concentration of said coal in said primary air; and slowing means for slowing said coal flowing at said higher concentration in said outer zone relative to the flow at said inner zone, prior to said mixing zone.

2. A burner for pulverized coal according to claim 1, wherein said coal distributing means and said slowing means are arranged so that said coal emerging from said outlet nozzle of said coal duct has substantially no component of flow outwardly from said axis.

3. A burner for pulverized coal according to claim 1, wherein said secondary air duct is adapted to give said secondary air a swirling flow around said axis.

4. A burner for pulverized coal according to claim 1, wherein said coal distributing means comprises a portion of said coal duct having an annular cross-section perpendicular to said axis of said annular cross-section having an inner diameter which decreases gradually in the direction of said flow along said coal duct.

5. A burner for pulverized coal according to claim 1, wherein said slowing means comprises at least one baffle located at said outlet nozzle of said coal duct so as to interrupt said flow at said outer zone.

6. A burner for pulverized coal according to claim 5, wherein said at least one baffle is shaped so as to give said flow substantially no swirling around said axis.

7. A burner according to claim 1 further including at least one tertiary air duct for tertiary air for combustion of said coal having at least one outlet nozzle more remote from said axis than said outlet nozzle of said secondary air duct.

8. A burner for pulverized coal according to claim 1, wherein said coal duct has an outer bounding wall and an inner bounding wall defining an annular flow passage for said flow along said coal duct, a portion of said inner bounding wall, close to said outlet nozzle, having an inner diameter decreasing gradually in the direction of said flow along said coal duct, thereby providing said inner zone having the lower concentration of said coal.

9. A powder heating apparatus comprising:
a combustion chamber for burning pulverized coal in air to produce combustion gases, said combustion chamber including at least one burner each of which comprising:
a coal duct for pulverized coal and primary air entraining said coal in a flow along said coal duct, said coal duct having an axis and an outlet nozzle at one axial end thereof,
at least one secondary air duct for secondary air for combustion of said coal having an outlet nozzle adjacent said outlet nozzle of said coal duct, such that said coal and primary air and said secondary air mix outside said nozzles in a mixing zone at which combustion occurs,
coal distribution means in said coal duct for providing in said flow, along said coal duct adjacent said outlet nozzle thereof, at least one outer zone spaced from said axis having a higher concentration of said coal in said primary air and at least one inner zone nearer said axis than said outer zone having a lower concentration of said coal in said primary air, and
slowing means for slowing said coal flowing at said higher concentration in said outer zone relative to the flow at said inner zone, prior to said mixing zone;
a chamber for heating powder; and
means communicating said powder heating chamber with said combustion chamber in that said combustion gases pass to said powder heating chamber.

10. A method of burning pulverized coal in a combustion chamber by means of a burner having an axis, a flow duct for pulverized coal and primary air entraining said coal, a first outlet nozzle into said combustion chamber at an end of said flow duct and at least one second outlet nozzle more remote from said axis than said first nozzle for flow of secondary combustion air into said chamber adjacent said first nozzle, said method comprising:
creating in said flow duct at least one outer zone of relatively higher concentration of coal in said primary air and at least one inner zone of relatively lower concentration of coal in said primary air, said inner zone being closer to said axis than said outer zone;
slowing the flow speed of said coal in said outer zone relative to that of said inner zone prior to mixing of said coal with said secondary air;
establishing a first flame zone adjacent said nozzles and a second flame zone more remote from said nozzles than said first combustion zone, the oxygen concentration in said second flame zone being lower than that in said first flame zone and being sufficiently low in said second flame zone that reduction of nitrogen oxides takes place therein.

11. A method according to claim 10 wherein said slowing of the flow speed of said coal in said outer zone is effected by the interruption of the flow of said outer zone by at least one baffle.

12. A method according to claim 10 further including providing a flow of tertiary combustion air from at least one third nozzle of said burner to at least the exterior of said second flame zone.

13. A boiler for heating water by combustion of pulverized coal comprising a combustion chamber for burning pulverized coal in air and means for heating said water as a result of the combustion of the pulverized coal, said combustion chamber including at least one burner each of which comprising:
an annular coal duct for a low of pulverized coal and primary air containing said coal, said coal duct having an axis, an outlet nozzle at an axial end thereof, and an outer bounding wall and an inner bounding wall defining an annular flow passage for said flow; and
an annular secondary air duct surrounding said coal duct and having an outlet nozzle around said outlet nozzle of said coal duct,
wherein a portion of said inner bourding wall close to said outlet nozzle of said coal duct has a frusto-conical shape of diameter reducing in the flow direction along said coal duct, and
wherein at least one baffle extends inwardly from said outer bounding wall at said outlet nozzle of said coal duct over a radial distance which is not more than 20% of the diameter of said outer bounding wall at the outlet nozzle.

14. A burner for pulverized coal comprising:
an annular coal duct for a flow of pulverized coal and primary air containing said coal, said coal duct having an axis, an outlet nozzle at an axial end thereof, and an outer bounding wall and an inner bounding wall defining an annular flow passage for said flow; and an annular secondary air duct surrounding said coal duct and having an outlet nozzle around said outlet nozzle of said coal duct, wherein a portion of said inner bounding wall close to said outlet nozzle of said coal duct has a frustoconical shape of diameter reducing in the flow direction along said coal duct, and wherein at least one baffle extends inwardly from said outer bounding wall at said outlet nozzle of said coal duct over a radial distance which is not more than 20% of the diameter of said outer bounding wall at the outlet nozzle.

15. A boiler for heating water by combustion of pulverized coal comprising a combustion chamber for burning pulverized coal in air and means for heating said water as a result of the combustion of the pulverized coal, said combustion chamber including at least one burner each of which comprising:

a coal duct for pulverized coal and primary air entraining said coal in a flow along said coal duct, said coal duct having an axis and an outlet nozzle at an axial end thereof; and at least one secondary air duct for secondary air for combustion of said coal having an outer nozzle adjacent said outlet nozzle of said coal duct, such that said coal and primary air and said secondary air mix outside said nozzles in a mixing zone at which combustion occurs;

coal distribution means in said coal duct for providing in said flow, along said coal duct adjacent said outlet nozzle thereof, at least one outer zone spaced from said axis having a higher concentration of said coal in said primary air and at least one inner zone nearer said axis than said outer zone having a lower concentration of said coal in said primary air; and slowing means for slowing said coal flowing at said higher concentration in said outer zone relative to the flow at said inner zone, prior to said mixing zone.

16. A boiler according to claim 15 having means for supplying pulverized coal to said burner, a particle size distribution sensor arranged to sense coal particle size distribution in the pulverized coal supplied to said burner, and control means arranged to control the particle size distribution of said pulverized coal supplied by said supplying means in dependence on an output of said sensor.

17. A boiler according to claim 16 wherein said sensor comprises a first flow region of said pulverized coal and primary air containing said pulverized coal, said first flow region having a generally increasing cross-sectional area in the flow direction, whereby radial separation of smaller coal particles and larger coal particles tends to occur at a second flow region immediately downstream of said first flow region, and further comprises means for sensing the concentration of coal particles at at least two radially spaced points in said second flow region.

18. A boiler according to claim 15 having a plurality of said burners, means for supplying pulverized coal to said burners, a plurality of particle size distribution sensors arranged to sense coal particle size distribution in pulverized coal supplied to said burners respectively, and control means arranged to vary the particle size distribution of pulverized coal supplied to said burners respectively by said supplying means in dependence on output signals of said sensors.

19. A boiler according to claim 18 wherein said control means is adapted to vary the particle size distribution of pulverized coal supplied to said burners in dependence on the operating load of the boiler.

20. A boiler for heating water by combustion of pulverized coal according to claim 15, wherein said coal distributing means and said slowing means are arranged so that said coal emerging from said outlet nozzle of said coal duct has substantially no component of flow outwardly from said axis.

21. A boiler for heating water by combustion of pulverized coal according to claim 15, wherein said secondary air duct is adapted to give said secondary air a swirling flow around said axis.

22. A boiler for heating water by combustion of pulverized coal according to claim 15, wherein said coal distributing means comprises a portion of said coal duct having an annular cross-section perpendicular to said axis of said annular cross-section having an inner diameter which decreases gradually in the direction of said flow along said coal duct.

23. A boiler for heating water by combustion of pulverized coal according to claim 15, wherein said slowing means comprises at least one baffle located at said outlet nozzle of said coal duct so as to interrupt said flow of said outer zone.

24. A boiler for heating water by combustion of pulverized coal according to claim 15, wherein said at least one baffle is shaped so as to give said flow substantially no swirling around said axis.

25. A boiler for heating water by combustion of pulverized coal according to claim 15, further including at least one tertiary air duct for tertiary air for combustion of said coal having at least one outlet nozzle more remote from said axis than said outlet nozzle of said secondary air duct.

26. A boiler for heating water by combustion of pulverized coal according to claim 15, wherein said coal duct has an outer bounding wall and an inner bounding wall defining an annular flow passage for said flow along said coal duct, a portion of said inner bounding wall, close to said outlet nozzle, having an inner diameter decreasing gradually in the direction of said flow along said coal duct, thereby providing said inner zone having the lower concentration of said coal.

27. A burner for pulverized coal comprising:

an coal duct for pulverized coal and primary air entraining said coal in a flow along said coal duct, said coal duct having an axis and an outlet nozzle at an axial end thereof; and at least one secondary air duct for secondary air for combustion of said coal having an outer nozzle adjacent said outlet nozzle of said coal duct, such that said col and primary air and said secondary air mix outside said nozzles in a mixing zone at which combustion occurs, wherein said coal duct includes over at least part of its length a core portion which provides at least one wall surface bounding said flow in said coal duct, said core portion having, close to said outlet nozzle of said coal duct, a region of gradually reducing cross-section in the direction of said flow such that the flow cross-section in said duct increases gradually in the direction of said flow, and wherein said outlet nozzle includes baffle means arranged to interrupt said flow in said coal duct at at least one outer zone thereof spaced from said axis and leave free said flow in said coal duct at at least one inner zone close to said axis than said outer zone, said baffle means having baffle surfaces facing said flow in said coal duct at an angle in the range 90° to 120° with respect to the axial direction of said flow.

28. A burner for pulverized coal according to claim 27, wherein said gradually reducing cross-section region of said core portion of said coal duct is provided by at least one surface at an angle in the range 10° to 45° to said axis.

29. A burner for pulverized coal according to claim 27, wherein said region of gradually reducing cross-section of said core portion is axially movable to adjust the position thereof relative to said outlet nozzle of said coal duct.

30. A burner for pulverized coal according to claim 27, wherein said baffle means is spaced from said region of gradually reducing cross-section of said core portion by a distance less than the maximum width of said coal duct at said outlet nozzle thereof.

31. A burner for pulverized coal according to claim 27, wherein said outlet nozzle of said secondary air duct has, at its side closer to said axis, a deflector adapted to give said secondary air an outward component of flow with respect to said axis.

32. A burner for pulverized coal according to claim 27, wherein in said coal duct, upstream of said region of gradually reducing cross-section, said core portion has a diameter which is in the range 30 to 80% of the outer diameter of the flow area in said coal duct.

33. A burner for pulverized coal according to claim 27, wherein said coal duct has an outer bounding wall and an inner bounding wall defining an annular flow passage for said flow along said coal duct, said core portion being formed in said inner bounding wall.

34. A boiler for heating water by combustion of pulverized coal comprising a combustion chamber for burning pulverized coal in air and means for heating said water as a result of the combustion of the pulverized coal, said combustion chamber including at least one burner each of which comprising:
  an coal duct for pulverized coal and primary air entraining said coal in a flow along said coal duct, said coal duct having an axis and an outlet nozzle at an axial end thereof; and
  at least one secondary air duct for secondary air for combustion of said coal having an outer nozzle adjacent said outlet nozzle of said coal duct, such that said coal and primary air and said secondary air mix outside said nozzles in a mixing zone at which combustion occurs,
wherein said coal duct includes over at least part of its length a core portion which provides at least one wall surface bounding said flow in said coal duct, said core portion having, close to said outlet nozzle of said coal duct, a region of gradually reducing cross-section in the direction of said flow such that the flow cross-section in said duct increases gradually in the direction of said flow, and
wherein said outlet nozzle includes baffle means arranged to interrupt said flow in said coal duct at at least one outer zone thereof spaced from said axis and leave free said flow in said coal duct at at least one inner zone closer to said axis than said outer zone, said baffle means having baffle surfaces facing said flow in said coal duct at an angle in the range 90° to 120° with respect to the axial direction of said flow.

35. A boiler for heating water by combustion of pulverized coal according to claim 34, wherein said gradually reducing cross-section region of said core portion of said coal duct is provided by at least one surface at an angle in the range 10° to 45° to said axis.

36. A boiler for heating water by combustion of pulverized coal according to claim 34, wherein said region of gradually reducing cross-section of said core portion is axially movable to adjust the position thereof relative to said outlet nozzle of said coal duct.

37. A boiler for heating water by combustion of pulverized coal according to claim 34, wherein said baffle means is spaced from said region of gradually reducing cross-section of said core portion by a distance less than the maximum width of said coal duct at said outlet nozzle thereof.

38. A boiler for heating water by combustion of pulverized coal according to claim 34, wherein said outlet nozzle of said secondary air duct has, at its side closer to said axis, a deflector adapted to give said secondary air an outward component of flow with respect to said axis.

39. A boiler for heating water by combustion of pulverized coal according to claim 34, wherein in said coal duct, upstream of said region of gradually reducing cross-section, said core portion has a diameter which is in the range 30 to 80% of the outer diameter of the flow area in said coal duct.

40. A boiler for heating water by combustion of pulverized coal according to claim 34, wherein said coal duct has an outer bounding wall and an inner bounding wall defining an annular flow passage for said flow along said coal duct, said core portion being formed in said inner bounding wall.

* * * * *